Oct. 10, 1944.  L. E. SHAW  2,360,076
VARIABLE SPEED TRANSMISSION
Filed June 27, 1942    6 Sheets-Sheet 3
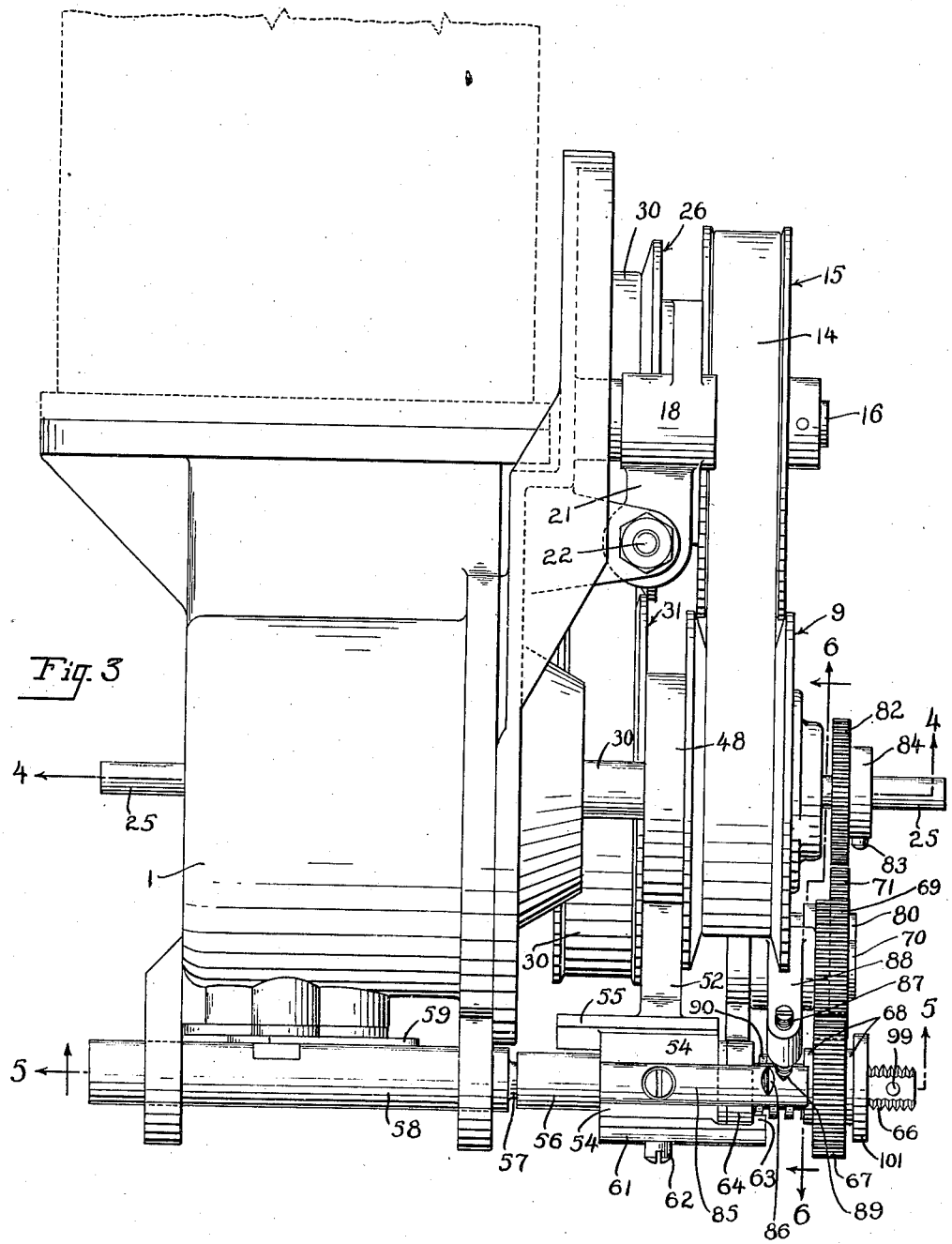
Fig. 3
Louis Eaton Shaw
INVENTOR
BY 
ATTORNEY Oct. 10, 1944.   L. E. SHAW   2,360,076
VARIABLE SPEED TRANSMISSION
Filed June 27, 1942   6 Sheets-Sheet 4

Louis Eaton Shaw
INVENTOR
BY
ATTORNEY

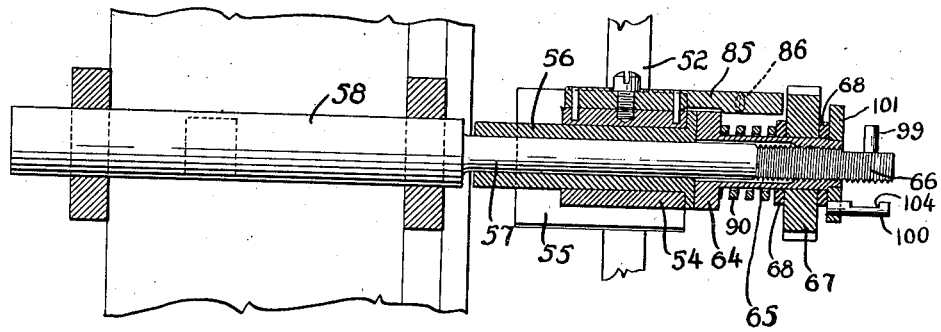
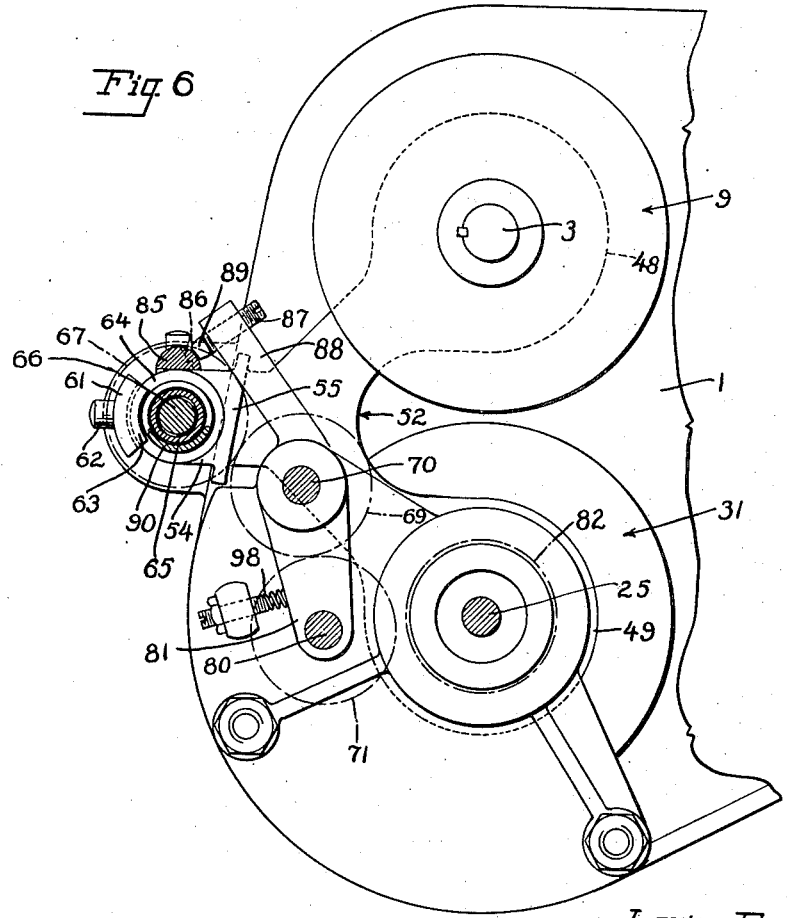

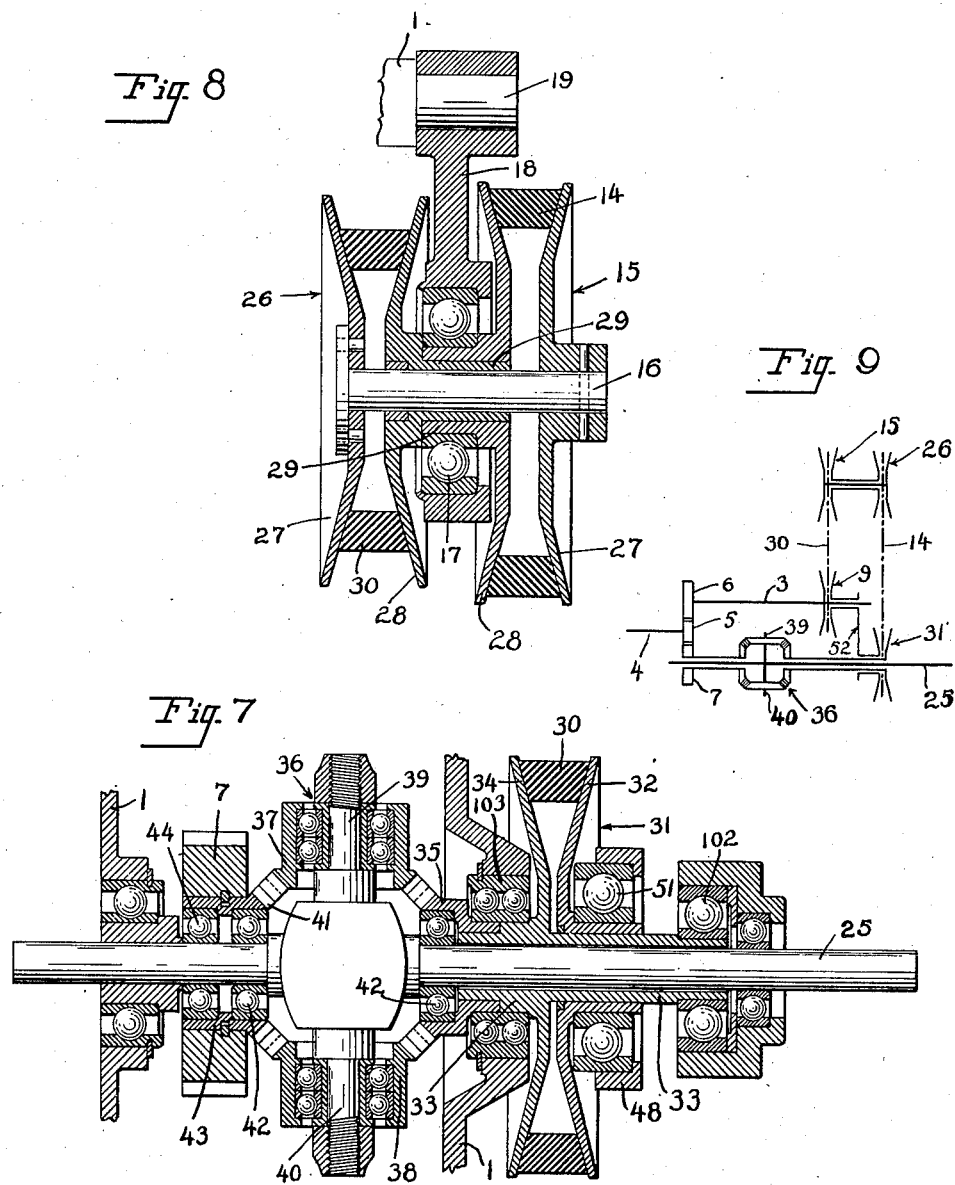

Patented Oct. 10, 1944

2,360,076

UNITED STATES PATENT OFFICE 2,360,076

VARIABLE SPEED TRANSMISSION

Louis Eaton Shaw, East Orange, N. J.

Application June 27, 1942, Serial No. 448,781

16 Claims. (Cl. 74—230.17)

This invention relates to variable speed power transmissions of the type in which a driving member is in driving relation with a driven member through the agency of speed adjusting means, including a pair of expansible sheaves over which V-belts travel and wherein by varying the radius of the arc which the belts travel around the expansible sheaves the speed ratio between the driving and driven members may be varied.

An object of the present invention is to provide a drive of the expansible sheave V-belt variable speed type, including a differential gearing in the driving connection between the driving and driven members whereby, by variation of the speed ratio between the driving and driven members, the drive may be regulated for forward and reverse driving or neutral non-driving relation between the driving and driven members.

Another object of the present invention is to provide a drive as specified, including a control lever, shiftable for regulating the speed ratio between the driving and driven members and providing forward, reverse and neutral non-driving connection between them.

A further object of the present invention is to provide in a drive as specified, compensating means automatically operable in the event the control lever is inaccurately moved to neutral position to compensate for wear in the transmission parts or slight inaccuracy in the machining or assembly of the parts, which compensating means automatically takes up control of the shifting action of the drive parts as the control lever approaches neutral so as to prevent "creeping" of the drive. The compensating mechanism is so constructed and arranged that it will not interfere with or in any way restrict the operation of the control lever by the operator, it being possible to shift the transmission units from one extreme, through neutral, to the other extreme without hindrance or any effect by the compensator or neutralizer. The compensator or neutralizer comes into play automatically, taking over control only when the control lever is at rest within certain predetermined limits of its adjustment with respect to the neutral position.

While the variable speed drive mechanism of the present invention is applicable for numerous uses and with numerous types of mechanisms, it is particularly adaptable for use in driving the rotating mechanism of gun turrets of airplanes, tanks or the like, where rapid, accurate movement and adjustment of the turret is necessary, with rapid reversal of the direction of its movement, and where with the operator under stress inaccuracies in movement of the control lever into neutral position to hold the turret stationary will be compensated for.

With these and other objects in view, as may appear from the accompanying specification, the invention consists of various features of construction and combination of parts, which will be first described in connection with the accompanying drawings, showing a Variable speed transmission of the preferred form embodying the invention, and the features forming the invention will be specifically pointed out in the claims.

In the drawings:

Figure 3 is a top plan of the improved variable speed drive showing the parts in the same position assumed in Figure 1; that is, not in neutral position.

Figure 5 is a fragmentary longitudinal section through the drive taken on the line 5—5 of Figure 3.

Figure 6 is a detail view, partly in elevation and partly in section, and taken on the line 6—6 of Figure 3.

Figure 7 is a fragmentary longitudinal section through the drive showing the association of the driven sheave, driven shaft and the differential.

Figure 8 is a detail longitudinal view through the intermediate sheave structure of the drive.

Figure 9 is a diagrammatic view in section, illustrating the method of operation of the drive.

Figure 1:
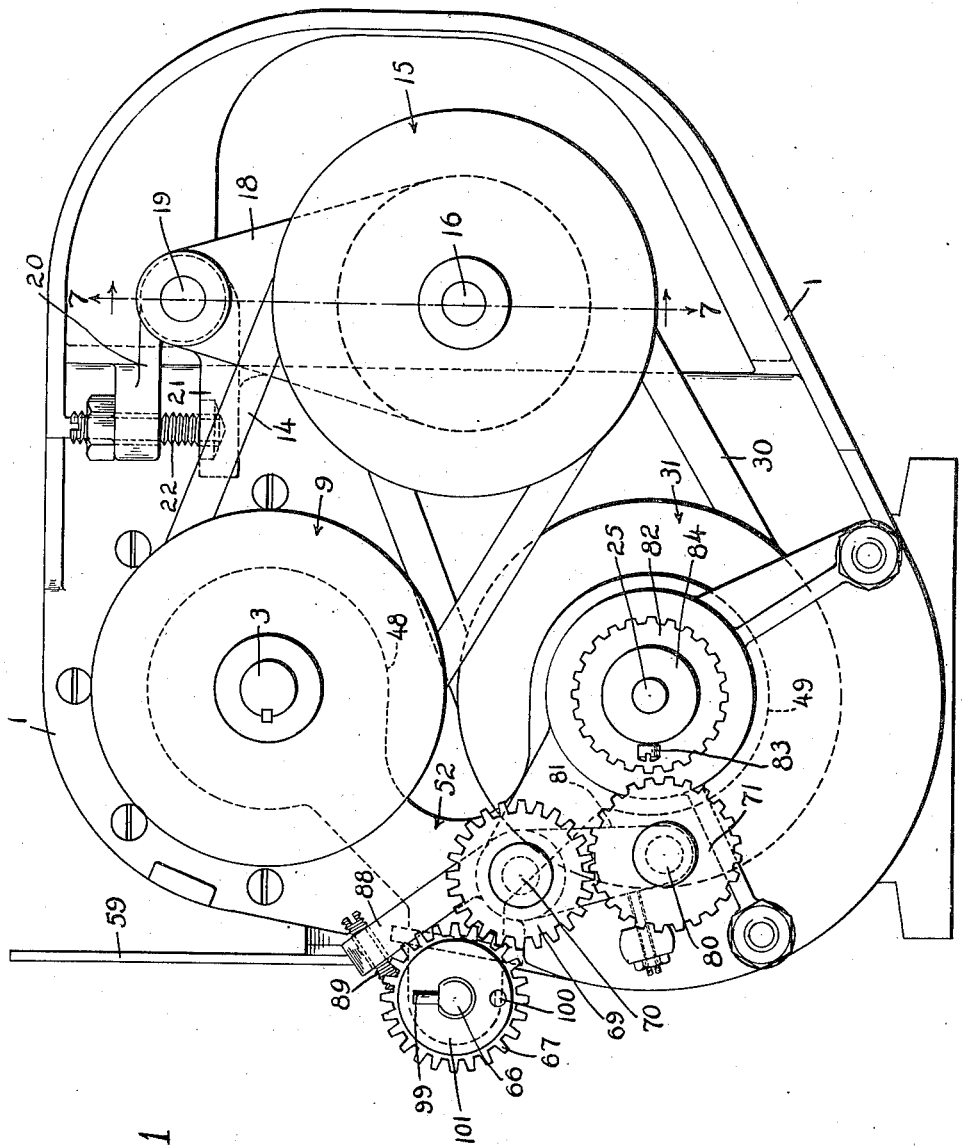
Figure 1 is an end elevation of the improved variable speed drive showing the parts out of a neutral position.

Referring more particularly to the drawings, the improved variable speed transmission comprises a housing or casing 1, which carries suitable bearings 2 in which the shaft 3 is rotatably mounted.

Power for driving the variable speed transmission is derived from a prime mover, indicated in dotted lines in Figure 3 of the drawings, of any suitable type, and such power is transmitted to the transmission through the driving shaft 4. The driving shaft 4 has a pinion 5 mounted thereon which meshes with a gear 6 on the shaft 3 and with a second gear 7 mounted on the differential gear 41.

The shaft 3 has an expansible V-groove sheave 9 mounted thereon which forms the driving sheave of the transmission. The driving sheave 9 comprises a section 10, which is pinned to the shaft 3, and a moveable section 11, which is slideably mounted on the shaft 3 but rotates with the shaft and with the section 9 through the medium of a key 12. The moveable section 11 is shiftable longitudinally on the shaft 3 toward or away from the non-shiftable section 10 to vary the radius of the arc of the V-belt 14, which travels about the sheave 9. That is, the section 11 is shiftable to vary the active belt engaging radius of the sheave 9. The V-belt 14, which travels about the sheave 9, also travels about the expansible sheave 15 of the intermediate transmission unit of the drive.

The intermediate transmission unit or assembly of the drive comprises, in addition to the expansible sheave 15, a shaft 16 rotatably and slideably carried by a bearing 17 positioned intermediate the ends of the shaft. The bearing 17 is carried by a bracket 18. The bracket 18 is hingedly or pivotally supported from the housing or frame 1 by a pivot pin 19 and its supporting bracket 20. An arm 21 is formed on the bracket 18 and has an adjusting screw 22 connected thereto. The adjusting screw 22 is threadably carried by the bracket 20 so that by adjustment of the screw 22 the bracket 18 may be swung upon the pivot pin 19 to vary the distance between the axis of the floating shaft 16 and the axis of the shaft 3, as well as between the axis of the floating shaft 16 and the driven shaft 25.

A second expansible sheave 26 is mounted upon the intermediate shaft 16. The sheaves 15 and 26 each comprise outer sections 27, pinned to the shaft 16 and moving with longitudinal movement of the shaft as well as rotating with the shaft. The inner sections 28 of the sheaves 15 and 26 are provided with telescoping tubular extensions 29 forming a bearing for the shaft 16 in which the shaft is free to revolve and move longitudinally independently of these sheave sections 28. The sheave sections 28 are so connected to each other as to be, in effect, one piece, so that their relative positions will always be the same. The bearing 17 engages the sleeves 29, as clearly shown in Fig. 8 of the drawings. A V-belt 30 travels about the sheave 26 and about the driven sheave 31.

The driven sheave 31 is an expansible sheave of the same type as the driving sheave 9 and the sheaves 15 and 26. Its laterally moveable section 32 is slideable upon the quill shaft 33, which is in turn rotatably mounted in the bearings 102 and 103. The section 34 of the sheave 31 is formed integrally with or suitably attached to the quill shaft 33 for rotation therewith. The section 32, while being slideable upon the quill shaft, is connected thereto so as to rotate with the quill shaft. The quill shaft 33 has the bevel gear 35 of the differential gearing 36 mounted thereon, and the bevel gear 35 meshes with the bevel pinions 37 and 38, these being rotatably mounted upon the stub shafts 39 and 40 carried by and projecting radially from the axis of the driven shaft 25. A second bevel gear 41 meshes with the pinions 37 and 38 on the opposite side of their axes of rotation from the bevel gear 35. The bevel gears 35 and 41 are rotatably supported with respect to the driven shaft 25 by suitable bearings 42. The bevel gear 41 is carried by and is integral with a sleeve 43 rotatably supported about the driven shaft 25 by one of the bearings 42 and by a bearing 44. The sleeve 43 has the gear 7 mounted thereon, the latter meshing with the pinion 5 on the driving shaft 4 and positioned on the opposite side of the axis of rotation of the pinion 5 from the gear 6.

Figure 4:
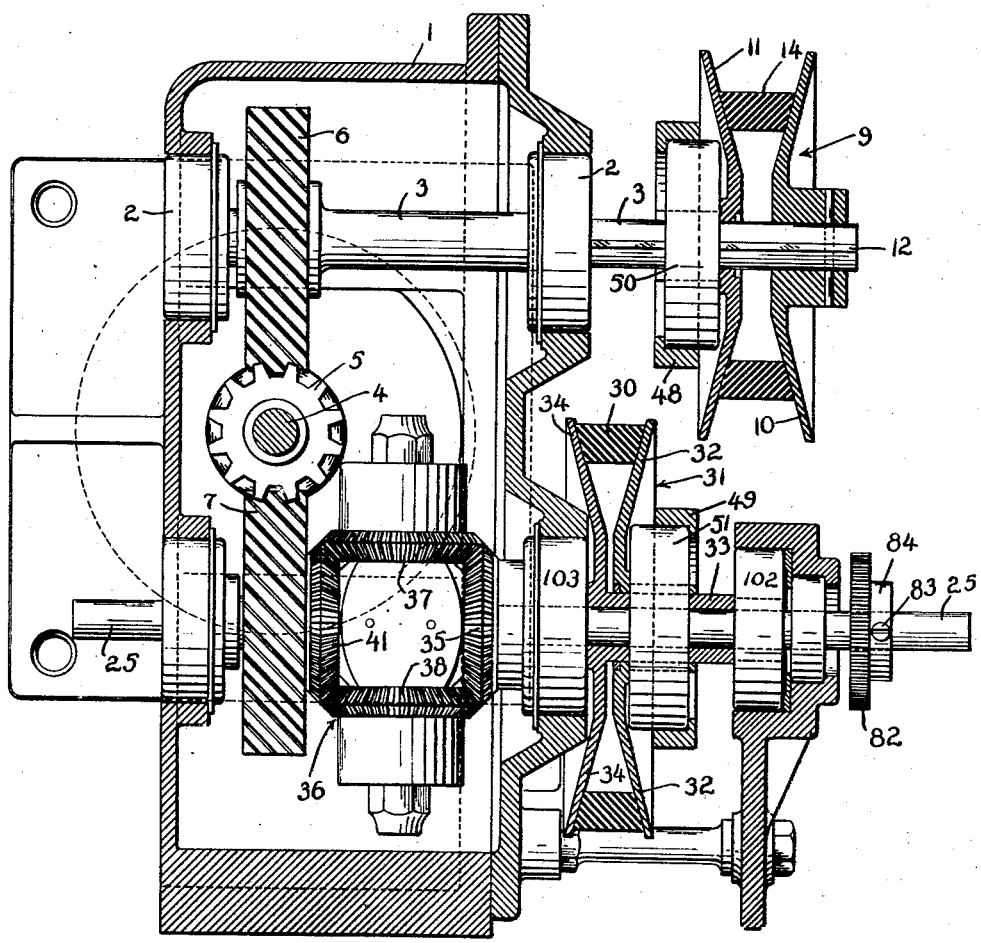
Figure 4 is a vertical section through the variable speed transmission taken on the line 4—4 of Figure 3.

Shifting collars 48 and 49 are connected to the shiftable sections 11 and 32 of the driving sheave 9 and driven sheave 31, respectively, through the medium of suitable bearings 50 and 51. The collars 48 and 49 are carried by the shifting plate 52, and by particular reference to Figures 4 and 6 of the drawings it will be noted that the collars 48 and 49 are shown upon opposite sides of the shifting plate 52, and that the sections 11 and 32 of the sheaves 9 and 31 are mounted in opposite relation so that these sections will be shifted in opposite directions, resulting in an increase in the radius of the belt arc traveling about the sheave 31 when the radius of the belt arc traveling about the driving sheave 9 is reduced. In this way the speed ratio between the driving sheave 9 and the driven sheave 31 and consequently the driven shaft 25 is varied. A hub 54 is carried by the extension 55 on the shifting plate 52, and thus hub is shrunk upon a sleeve 56. The sleeve 56 is slideably mounted upon the reduced portion 57 of the shifting rod 58. A shifting lever 59 is pivotally connected to the housing 1, as shown at 60, and is suitably connected to the shifting rod 58 to shift the rod upon pivotal movement of the lever 59. A plate 61 is attached to the hub 54 in any suitable manner, such as by the screw 62, and it has an inwardly extending abutment 63 formed thereon which engages the outer end of the flange 64 formed on the sleeve 65. The sleeve 65 is rotatably mounted upon the threaded end 66 of the rod 58. A gear 67 is mounted upon the sleeve 65 for rotation with the sleeve, and it is held in frictional engagement therewith by means of the friction washers 68 and spring 90. The gear 67 meshes with a gear 69 rotatably mounted upon a stub shaft 70. The gear 69 in turn meshes with a gear 71 carried by a stub shaft 80. The stub shaft 80 is in turn carried by a rocker arm 81, pivotally mounted upon the stub shaft 70. A gear 82 is mounted upon the driven shaft 25, being connected to the driven shaft 25 by means of the set screw 83, which extends through the hub 84 of the gear 82. As shown in Figures 1 and 6 of the drawings, the gears 71 and 82 are normally out of meshing engagement.

A cam 85 is attached to the hub 54 and has a notch or indented cam surface 86 cut therein, the sides of which incline upwardly and outwardly from the inner limit of the cam surface. A cam pin 87 is adjustably carried by the arm 88 of the rocker arm 81, and it has a tapered chisel end 89 which rides over the outer surface of the cam 85, and at predetermined times drops into the cam notch 86, as will be hereinafter more particularly referred to.

When the shifting lever 59 is moved to the left (see Figure 2 of the drawings) from its neutral position, it will shift the shifting rod 58 to the right, moving the section 11 of the driving sheave 9 toward the section 10 and increasing the radius of the arc of the belt 14 traveling about the driving sheave 9, and at the same time it will move the section 32 of the driven sheave 31 away from the section 34 thereof, decreasing the radius of the arc of the belt 30 traveling about the driven sheave 31. The belt 14 travels about the sheave 15 of the intermediate assembly, while the belt 30 travels about the sheave 26 of the intermediate assembly. The moveable sections 27 of the intermediate sheaves 15 and 26 will automatically follow the adjustments of the adjustable sections 11 and 32 of the sheaves 9 and 31, respectively, varying the speed ratio between the driving sheave 9 and the driven sheave 31 in proportion to the degree of adjustment of the moveable sections 11 and 32. When the shifting lever 59 is moved to the right (Figure 2 of the drawings) the rod 58 will be shifted to the left and the sections 11 and 32 will be shifted to vary the speed ratio between the driving sheave 9 and the driven sheave 31.

Figure 2:
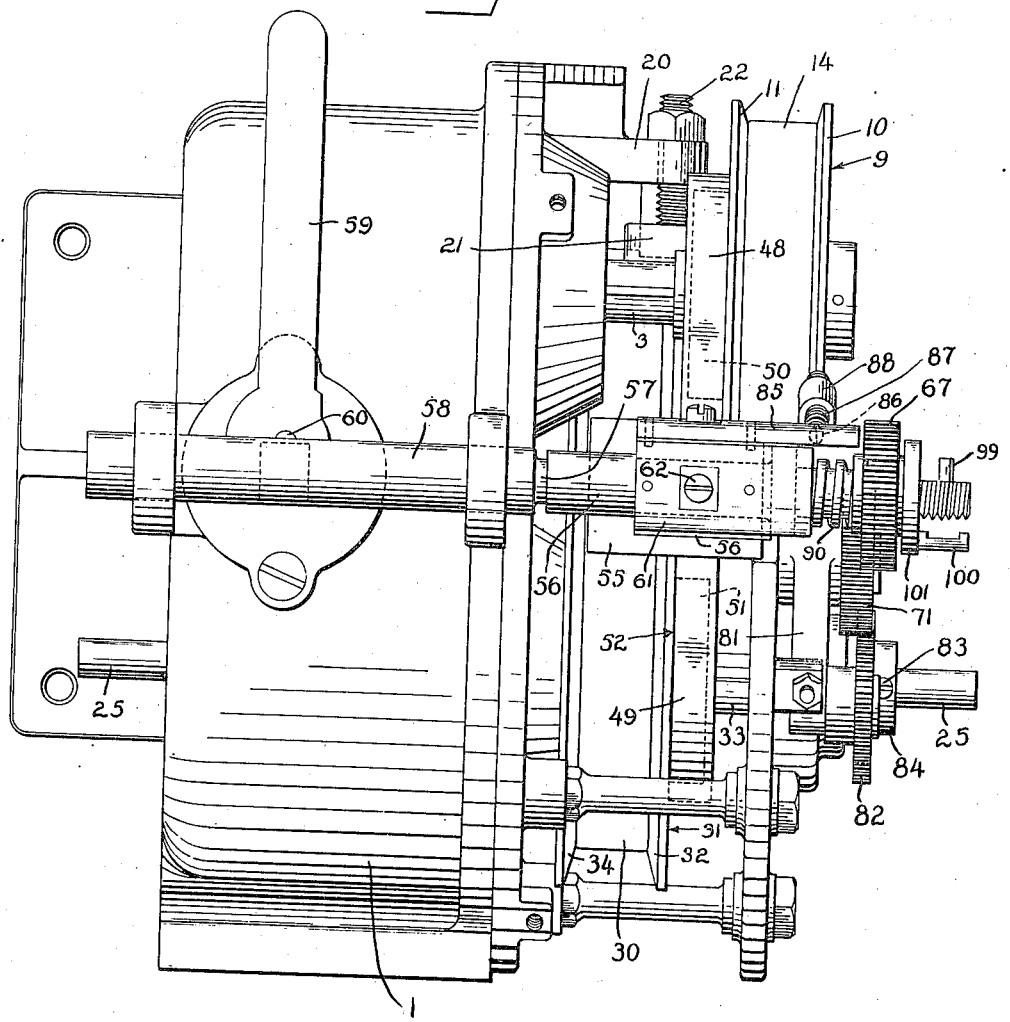
Figure 2 is a side elevation of the improved variable speed drive showing the parts in neutral position.

When the shifting lever 59 is in its neutral position, as shown in Figure 2 of the drawings, then the sections 11 and 32 of the sheaves 9 and 31, respectively, will be in corresponding positions so that the radii of the arcs of the belts traveling about the sheaves 9 and 31 will be the same, and the sheaves 9 and 31 will be driven at the same rate of speed, at which time the drive will be in neutral position; that is, the driven shaft 25 will be stationary due to the provision of the differential gearing structure 36.

In employing the variable speed drive of the present invention as control or driving transmission for driving the gun turrets of airplanes or tanks, as well as in other uses to which the drive may be put, it is desirable that the driven shaft, which is the power take-off shaft and is directly connected to the turret (not shown), be stationary whenever the shifting lever 59 is in or near its neutral position, and any creeping of the drive, and consequently of the turret, must be eliminated. Due to wear on parts of the drive, slight inaccuracies in machining, or failure of the operator to move the shifting lever 59 into exact neutral position, creeping of the drive would result when it was desired that the driven shaft be stationary, and it is for the purpose of preventing such creeping action that the cam 85 and gear train comprising the gears 67, 69, 71 and 82 are provided.

As the lever 59 approaches neutral position, either from the right or left, and comes within a predetermined distance of this neutral position, the knife edge 89 of the cam pin 87 will start movement into the notch 86 in the cam 85, causing the rocker arm 81 to move on its pivot 70 to move the gear 71 into mesh with the gear 82. When the knife edge 89 reaches its full position in the notch the drive is in neutral position. A spring 98 is provided which engages the rocker arm 81 to insure the movement of the rocker arm when the knife edge 89 is in registering position with the notch 86. When the gears 82 and 71 are in meshing engagement, the rotation of the shaft 25 will, through the gears 69 and 67, rotate the sleeve 65, moving its longitudinally of the shifting rod 58 due to the threadable connection between the shifting rod 58 and the sleeve 65. The direction of movement of the sleeve 65 will depend upon the direction of rotation of the shaft 25, but in every instance it is such that it will move the sleeve 65 in the proper direction to shift the hub 54 and consequently the shifting plate 52 to exact neutral position; that is, into the position where both the driving sheave 9 and the driven sheave 31 will be rotated at the same speed. A stop pin 99 is carried by the shifting rod 58, and a contact pin 100 is carried by a suitable disc 101. The disc 101 is in turn carried by the sleeve 65 so that during the rotation of the sleeve 65 the contact pin 100 will engage the stop pin 99 and arrest rotary movement of the sleeve 65, and at the same time arrest longitudinal movement of the sleeve, which will in turn stop movement of the shifting plate 52. The stop pin 99, the pitch of the thread 66 and the width of the notch 104 in pin 100 combine to limit the extent to which the sleeve 65 can move longitudinally of the shifting rod 58. This, in turn, defines the range through which the compensator or neutralizer mechanism can automatically take up the control of the shifting action. Beyond this predetermined range the compensator can have no effect, even though gears 71 and 82 have not been forced out of mesh and gear 67 is still revolving in frictional engagement with the friction washer 68.

The forward, neutral and reverse driving of the driven shaft 25 is controlled through variation of the speed ratio between the driving sheave 9 and the driven sheave 31. As previously described, this variation in the speed ratio is provided by movement of the shifting lever 59.

With the driving sheave 9 and the driven sheave 31 rotating at the same rate of speed, it will be apparent that the bevel gears 35 and 41, being respectively rotated from the gears 6 and 7, will rotate at the same speed, but in opposite directions, and the pinions 37 and 38 will remain stationary; that is, they will not rotate about the axis of the driven shaft 25, and consequently will not rotate the driven shaft 25 and thus the drive will be in neutral position. When the driven sheave 31 is adjusted to rotate at a greater rate of speed than the driving sheave 9, then the bevel gear 35 will rotate at a greater rate of speed than the bevel gear 41, which will result in a rotation of the pinions 37 and 38 and stub shafts 39 and 40 under the influence of the bevel gear 35, and in the same direction. As the control lever 59 is shifted so that the speed ratio between the driving and driven sheaves is changed to a degree where the driven sheave is rotated at a speed slower than that of the driving sheave 9, then due to the connection of the bevel gear 41 with the driving shaft 4 through the gear 7 the bevel gear 41 will be rotated at a greater rate of speed than the bevel gear 35, and the pinions 37 and 38 and the stub shafts 39 and 40 will be rotated under control of or by the bevel gear 41, causing the rotation of the driven shaft 25 in a reverse direction. Variation in the rates of speed of rotation of the driven shaft 25 either in forward or reverse may, of course, be controlled by the degree of shifting of the lever 59 and consequently by the degree of shifting of the sections 11 and 32 of the sheaves 9 and 31, respectively, and thus the speed of rotation of the driven shaft 25, its rotation in either the forward or reverse direction, or its working in a neutral position, are all controlled by variation in the speed ratios between the driving sheave 9 and the driven sheave 31.

It will be understood that the invention is not to be limited to the specific construction or arrangement of parts shown, but that they may be widely modified within the invention defined by the claims.

What is claimed is:

1. In a variable drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, and compensating means co-acting with said first mentioned means for automatically adjusting said expansible driving and driven sheaves to equal speed positions when brought substantially to said positions by said first-mentioned means.

2. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, compensating means co-acting with said first mentioned means for automatically adjusting said expansible driving and driven sheaves to equal speed positions when the sheaves are brought substantially to said positions by said first mentioned means, and stop means for arresting operation of said compensating means within predetermined limits.

3. In a variable speed drive as specified, a driving and a driven sheave each including a shiftable section, means for shifting said sections to vary the speed ratio between the sheaves, means automatically coming into operation as said shifting means approaches within predetermined limits the position where the sheaves will rotate at the same speed to automatically shift the sheave sections into the position at which they will rotate at the same speed, said automatic means including a cam, means engaging said cam and movable by the cam as it is stopped within predetermined limits from its position assumed when the sections of the sheaves are in position to provide the same speed of rotation of the sheaves, and means operable by movement of said cam engaging means to continue movement of the sheave sections to the position where the rotative speeds of the sheaves are the same.

4. In a variable speed drive as specified, a driving and a driven sheave each including a shiftable section, means for shifting said sections to vary the speed ratio between the sheaves, means automatically coming into operation as said shifting means approaches within predetermined limits the position where the sheaves will rotate at the same speed to automatically shift the sheave sections into the position at which they will rotate at the same speed, said automatic means including a cam, means engaging said cam and movable by the cam as it is stopped within predetermined limits from its position assumed when the sections of the sheaves are in position to provide the same speed of rotation of the sheaves, means operable by movement of said cam engaging means to continue movement of the sheave sections to the position where the rotative speeds of the sheaves are the same, and stop means for arresting operation of said last named means when said shifting means have exceeded said predetermined limits.

5. In a variable speed drive as specified, a driving and a driven sheave each including a shiftable section, means for shifting said sections to vary the speed ratio between the sheaves, means automatically coming into operation as said shifting means approaches within predetermined limits the position where the sheaves will rotate at the same speed to automatically shift the sheave sections into the position at which they will rotate at the same speed, said automatic means including a cam, means engaging said cam and moveable by the cam as it is stopped within predetermined limits from its position assumed when the sections of the sheaves are in position to provide the same speed of rotation of the sheaves, and means operable by movement of said cam engaging means to continue movement of the sheave sections to the position where the rotative speeds of the sheaves are the same, said cam and said last named means constructed and arranged whereby operation of said last named means will be arrested when the sheave sections reach the position where the rotative speeds of the sheaves are the same.

6. In a variable speed drive as specified, a driving and a driven sheave each including a shiftable section, means for shifting said sections to vary the speed ratio between the sheaves, and means automatically adjusting said shiftable sections to equal speed positions when the sections are brought substantially to said positions by said first-mentioned means and for yieldingly maintaining the sections in said positions.

7. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, and compensating means co-acting with said first mentioned means for automatically adjusting said expansible driving and driven sheaves to equal speed positions when they are brought approximately to said positions by said first mentioned means, said compensating means including a gear on said driven shaft, a movable gear train, means for moving the gear train to move one of the gears thereof in mesh with the driven shaft carried gear as the expansible driving and driven sheaves approach adjusted equal speed positions, means connecting said gear train to said sheave adjusting means to provide operation of the sheave adjusting means by the gear train, and means for rendering the gear train inoperative when the expansible driving and driven sheaves reach equal speed positions.

8. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ration between the sheaves, and compensating means co-acting with said first mentioned means for automatically adjusting said expansible driving and driven sheaves to equal speed positions when they are brought approximately to said positions by said first mentioned means, said compensating means including a gear on said driven shaft, a movable gear train, means for moving the gear train to move one of the gears thereof in mesh with the driven shaft carried gear as the expansible driving and driven sheaves approach adjusted equal speed positions, a movable sleeve connected to said sheave adjusting means, means operated by operation of said gear train for moving said sleeve to operate said sheave adjusting means, and means for arresting movement of said sleeve after a predetermined degree of movement thereof.

9. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, and means carried by said shifting rod for automatically adjusting said driving and driven sheaves to equal speed positions when they are brought approximately to said positions by movement of the shifting rod by its moving lever.

10. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a cam carried by said rod and movable therewith, and means co-acting with said cam for automatically adjusting said driving and driven sheaves to equal speed positions when brought approximately to said positions by movement of the shifting rod by its moving lever.

11. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a gear on said driven shaft, a movable gear train, means for moving the gear train to move one of the gears thereof into mesh with the driven shaft carried gear as the expansible driving and driven sheaves approach equal speed positions, means connecting said gear train to said shifting rod for automatically adjusting said driving and driven sheaves to equal speed positions when brought approximately to said positions by movement of the shifting rod by its moving lever.

12. In a variable speed drive, an expansible driving sheaves, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a gear on said driven shaft, a movable gear train, a cam carried by said rod movable therewith, and means co-acting with said cam to move said gear train to move one of its gears into mesh with the driven shaft carried gear as the expansible driving and driven sheaves approach equal speed positions, means operated by said gear train for automatically adjusting said driving and driven sheaves to equal speed positions.

13. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a gear on said driven shaft, a movable gear train, a cam carried by said rod and movable therewith, means co-acting with said cam to move said gear train to move one of its gears into mesh with the driven shaft carried gear as the expansible driving and driven sheaves approach equal speed positions, means operated by said gear train for automatically adjusting said driving and driven sheaves to equal speed positions, and means for rendering the gear train inoperative when the expansible driving and driven sheaves reach equal speed positions.

14. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a movable sleeve yieldably connected to said sheave adjusting means, means for moving said sheave to automatically adjust said driving and driven sheaves to equal speed positions when they are brought substantially to said positions by movement of said shifting rod.

15. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a movable sleeve adjustably connected to said sheave adjusting means, and means operated by said driven shaft to move said sleeve for automatically adjusting said driving and driven sheaves to equal speed positions when they are brought approximately to said positions by movement of said shifting rod.

16. In a variable speed drive, an expansible driving sheave, a driven shaft, an expansible driven sheave, an intermediate assembly including a pair of expansible intermediate sheaves mounted for rotary movement about a common axis offset from the axes of said driving and driven sheaves, a pair of V-belts in driving engagement with said intermediate sheaves and engaging said driving and driven sheaves, means for adjusting said expansible driving and driven sheaves for varying their active belt engaging radii to vary the speed ratio between the sheaves, a shifting rod for operating said sheave adjusting means, a lever for moving said shifting rod, a movable sleeve adjustably connected to said sheave adjusting means, means operated by said driven shaft to move said sleeve for automatically adjusting said driving and driven sheaves to equal speed positions when they are brought approximately to said positions by movement of said shifting rod, and means for arresting movement of said sleeve after a predetermined degree of movement thereof.

LOUIS EATON SHAW.